United States Patent
Nicole et al.

(10) Patent No.: US 12,213,415 B2
(45) Date of Patent: Feb. 4, 2025

(54) METHODS AND SYSTEMS FOR IRRIGATING A CANNABIS PLANT

(71) Applicant: SIGNIFY HOLDING B.V., Eindhoven (NL)

(72) Inventors: Céline Catherine Sarah Nicole, Eindhoven (NL); Esther De Beer, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1 day.

(21) Appl. No.: 18/274,053

(22) PCT Filed: Jan. 27, 2022

(86) PCT No.: PCT/EP2022/051826
§ 371 (c)(1),
(2) Date: Jul. 25, 2023

(87) PCT Pub. No.: WO2022/162035
PCT Pub. Date: Aug. 4, 2022

(65) Prior Publication Data
US 2024/0237596 A1 Jul. 18, 2024

(30) Foreign Application Priority Data
Jan. 29, 2021 (EP) .................... 21154186

(51) Int. Cl.
*A01G 25/16* (2006.01)
*A01G 22/15* (2018.01)

(52) U.S. Cl.
CPC ........... *A01G 25/165* (2013.01); *A01G 22/15* (2018.02)

(58) Field of Classification Search
CPC ........ A01G 22/00; A01G 22/15; A01G 25/16; A01G 25/162; A01G 25/165; A01G 25/167; A01G 27/00; A01G 27/001; A01G 27/003
USPC ........................................... 47/48.5
See application file for complete search history.

(56) References Cited

U.S. PATENT DOCUMENTS

| 2016/0088809 A1* | 3/2016 | Lowe | A01G 24/44 47/59 S |
|---|---|---|---|
| 2016/0184237 A1 | 6/2016 | Lowe et al. | |
| 2017/0094920 A1 | 4/2017 | Ellins et al. | |
| 2018/0343900 A1 | 12/2018 | Leo | |

(Continued)

FOREIGN PATENT DOCUMENTS

| CN | 104604502 A | * | 5/2015 | ............ A01G 22/00 |
|---|---|---|---|---|
| CN | 106416735 A | * | 2/2017 | ............ A01G 22/00 |
| EP | 3771330 A1 | * | 2/2021 | ............ A01G 22/00 |

(Continued)

*Primary Examiner* — Ebony E Evans

(57) ABSTRACT

A method for irrigating a *Cannabis* plant is disclosed. The method comprises, before a pruning of the *Cannabis* plant, providing water to the *Cannabis* plant at a first rate. The method comprises, performing said pruning of the *Cannabis* plant. The method comprises, before said pruning, in a time window that extends from one hour before said pruning to one hour after said pruning, changing the rate of water provisioning to the *Cannabis* plant from the first rate to a second rate, the second rate being lower than the first rate. The method further comprises, after said pruning of the *Cannabis* plant, providing water to the *Cannabis* plant at the second rate for at least 15 minutes.

15 Claims, 7 Drawing Sheets

(56) References Cited

U.S. PATENT DOCUMENTS

2020/0134741 A1    4/2020  Bongartz et al.
2022/0408661 A1 *  12/2022 Bitz .................. A01G 9/26

FOREIGN PATENT DOCUMENTS

| KR | 20230022286 A * | 2/2023 | ............ A01G 22/00 |
| WO | WO-2016054268 A1 * | 4/2016 | ............ A01G 1/001 |
| WO | 2019022860 A1 | 1/2019 | |
| WO | 2020146944 A1 | 7/2020 | |
| WO | 2020254241 A1 | 12/2020 | |

* cited by examiner

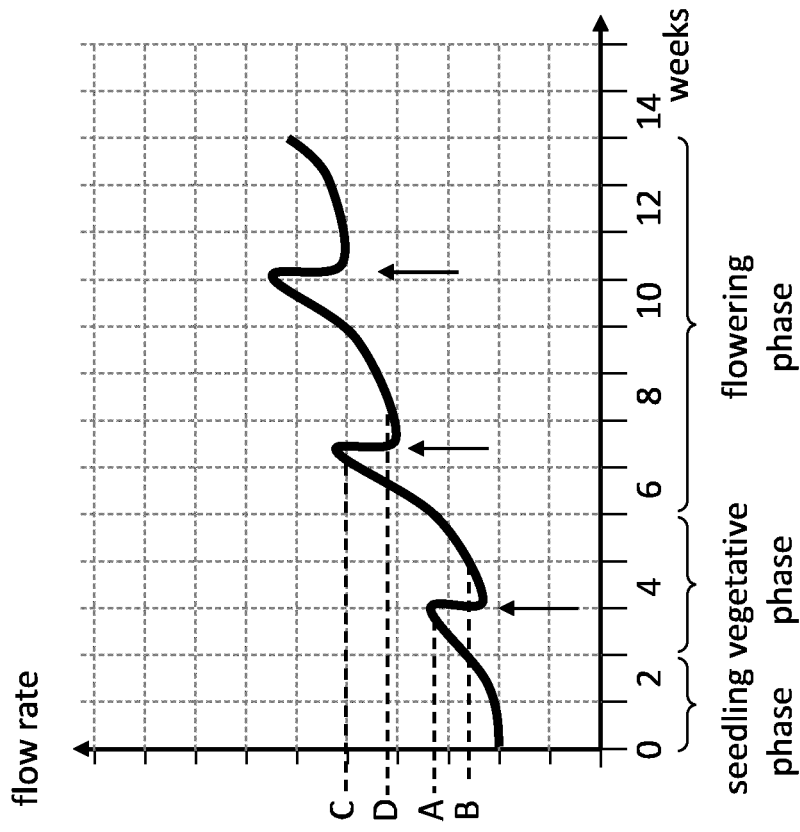
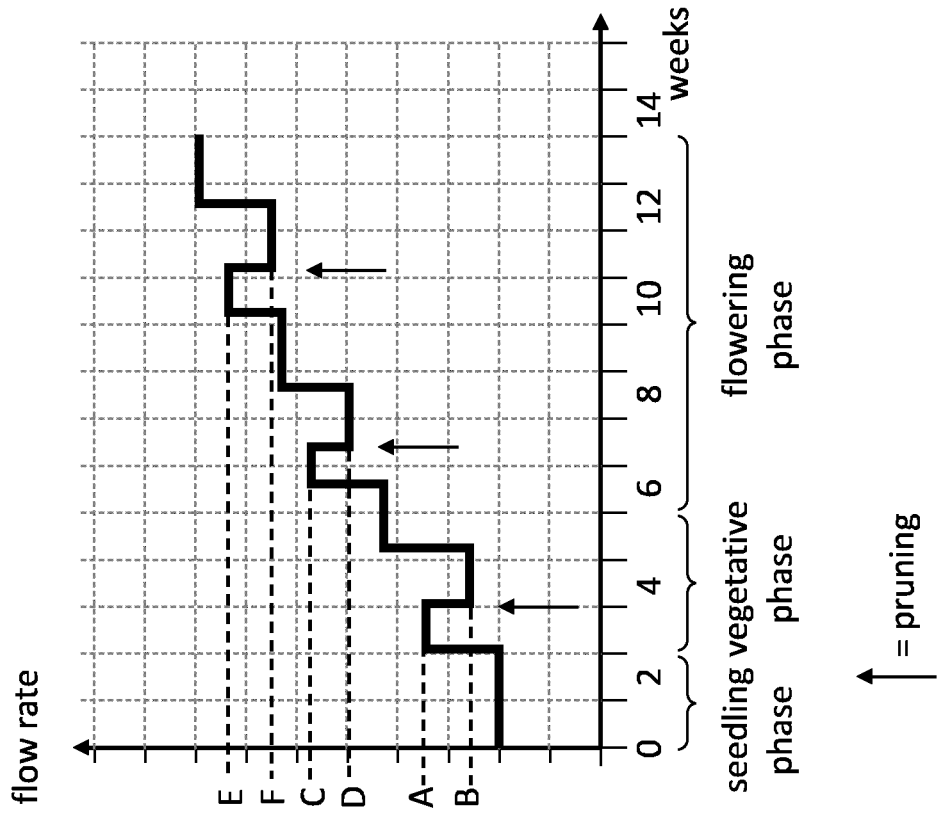
Fig. 1B
Fig. 1A
↑ = pruning

METHODS AND SYSTEMS FOR IRRIGATING A CANNABIS PLANT

CROSS-REFERENCE TO PRIOR APPLICATIONS

This application is the U.S. National Phase application under 35 U.S.C. § 371 of International Application No. PCT/EP2022/051826, filed on Jan. 27, 2022, which claims the benefit of European Patent Application No. 21154186.7, filed on Jan. 29, 2021. These applications are hereby incorporated by reference herein.

FIELD OF THE INVENTION

This disclosure relates to methods and systems for irrigating a *Cannabis* plant. In particular to such methods and systems wherein a rate of water provisioning is reduced before and/or during and/or after pruning the *Cannabis* plant. This disclosure further relates to computer-implemented methods, computer programs, control systems and storage media for such methods and systems.

BACKGROUND

*Cannabis sativa* is a flowering annual plant whose phytochemical by-products are prescribed to relieve the symptoms of a medical condition, such as relieving pain and prevent nausea. An example of such by-product is CBD (cannabidiol). Furthermore, it has anti-inflammatory and antioxidant properties. As many countries have intentions to legalize the medical use of *Cannabis*, the amount of harvested *Cannabis* per year is expected to increase considerably.

Medicinal *Cannabis* needs to be grown under controlled circumstances to be able to guarantee a sufficient quality. To this end, growth mostly takes place in greenhouses or indoor (i.e. without daylight). For optimum quality, e.g. optimal and reproducible phytochemical content, supplemental light is used, e.g. based on LED lighting, typically having high intensity. For the grower, the goal is to accelerate the full cycle of the plant growth from propagation to flowering. To this end, light levels are often raised rather fast from 100 micromol/m$^2$/s to 800-1000 micromol/m$^2$/s within 2 weeks or even within 1 week time.

During the *Cannabis* growth phase, the vegetative plant will transit to flowering induced by lowering the photoperiod. The photoperiod may be understood as the amount of time per day that a plant is exposed to light. The photoperiod for example goes from 18 h to 12 h, and this induces morphological changes on the vegetative plants, creating more branching ramification and more leaves as a first stage of the flower transition. During this phase, as said, light levels are increased. As the plant grows, the irrigation level is increased as well. Too little water namely compromises the growth and substrate hydrophilic properties. This increase is usually done step by step on a weekly basis.

It is an object of the present disclosure to provide improved irrigation control systems and methods that aid to increase the yield of a medicinal *Cannabis* farm.

WO 2020/254241 discloses a lighting method for providing light to a *Cannabis* plant during at least a flowering stage of the *Cannabis* plant. The document discloses that when stressing the plant using light, the irrigation should be adapted to ensure the plant does not de-hydrate.

SUMMARY

To that end, a method for irrigating a *Cannabis* plant is disclosed. The method comprises, before a pruning of the *Cannabis* plant, providing water to the *Cannabis* plant at a first rate. The method optionally comprises, performing said pruning of the *Cannabis* plant. The method comprises, before and/or during and/or after said pruning, changing the rate of water provisioning to the *Cannabis* plant from the first rate to a second rate, the second rate being lower than the first rate. The method further comprises, after said pruning of the *Cannabis* plant, providing water to the *Cannabis* plant at the second rate. The steps of (1) providing water to the *Cannabis* plant at a first rate, (2) changing the rate of water provisioning to the *Cannabis* plant from the first rate to a second rate and (3) providing water to the *Cannabis* plant at the second rate are obviously performed sequentially.

The invention is defined by the appended claims.

Typically, photosynthesis is treated as the main driver of plant growth and development. Hence, the illumination is controlled accordingly, for example by carefully selecting efficient light spectrum for supplemental lighting, adjusting photoperiod et cetera. However, respiration and transpiration are not so much concerned in the field of *Cannabis* growth. The inventors have realized that if a *Cannabis* plant is exposed to illumination of high radiant power, also referred to as high intensity illumination, and/or to high temperatures, which is typically the case in medicinal *Cannabis* farms, the respiration and transpiration characteristics of the *Cannabis* plant significantly influence the growth and development of the *Cannabis* plant.

The three major functions that are basic to plant growth are photosynthesis, respiration and transpiration:

Photosynthesis—The process of capturing light energy and converting it to sugar energy, in the presence of chlorophyll using carbon dioxide ($CO_2$) and water ($H_2O$).

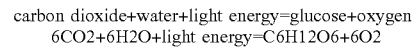

$$\text{carbon dioxide} + \text{water} + \text{light energy} = \text{glucose} + \text{oxygen}$$
$$6CO_2 + 6H_2O + \text{light energy} = C_6H_{12}O_6 + 6O_2$$

Respiration—The process of metabolizing (burning) sugars to yield energy for growth, reproduction, and other life processes

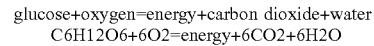

$$\text{glucose} + \text{oxygen} = \text{energy} + \text{carbon dioxide} + \text{water}$$
$$C_6H_{12}O_6 + 6O_2 = \text{energy} + 6CO_2 + 6H_2O$$

Transpiration—The loss of water vapor through the stomata of leaves

Water in the roots is pulled through the plant by transpiration. Under high intensity illumination and/or under high temperatures, transpiration uses about 90% of the water that enters the plant. The other 10% of the water intake is used as an ingredient in photosynthesis and cell growth. Hence, the transpiration characteristics of the *Cannabis* plant greatly influence how much water should be provided to the *Cannabis* plant at any given time.

During the vegetative to flowering transition, a *Cannabis* plant is typically pruned by workers/growers. Sometimes even half of the biomass of the plant is removed during pruning. This pruning is meant to give the plant a specific shape that would enhance the light penetration in the canopy, or the plant production, induce compactness to keep the plant low level to allow easy access during further interventions. While the plant is grown indoor (greenhouse or fully closed environment) supplemental light is added to vegetative phase after the cuttings have propagated.

The inventors have realized that such pruning may significantly influence the transpiration characteristics of a *Cannabis* plant, i.e. cause the plant to have a lower transpiration capacity because leaves including their stomata are removed. Hence, keeping the rate of water provisioning to the plant after pruning at the same level as before pruning poses a risk of overwatering the plant. The presence of excess water in a plant decreases nutrient uptake and reduces growth, stressing the plants (water stress) and thus negatively influences plant growth and development.

Therefore, in the methods for irrigating a *Cannabis* plant disclosed herein, the rate with which water is provided to the plant after pruning of the plant is lower than before pruning of the plant. As a result, the plant can maintain an optimum water balance and can grow and develop without being hampered.

As used herein, a rate at which water is provided to a *Cannabis* plant, also referred to as the rate of water provisioning, defines the amount of water that is provided to the *Cannabis* plant per unit of time. The rate is preferably expressed as an amount of provided water per day or per 24 hours, for example 500 ml/day. It should be appreciated that the rate of water provisioning may vary throughout a day. It may be that water is provided during the first half of a day and that no water is provided during the second half of the day.

In an embodiment, the first rate is equal to the amount of water provided to the plant in the 24 hours leading up to the pruning and the second rate is equal to the amount of water provided in the 24 hours directly following the pruning.

Of course, in any comparison between the first and second rate, the first and second rate should be expressed in the same units. Thus, if the first rate is A ml/hours, then the second rate is B ml/hours, where B is lower than A. As another example, if the first rate is A ml/day, then the second rate is B ml/day, where B is lower than A.

The methods disclosed herein may be performed manually, for example by a *Cannabis* farmer pruning the *Cannabis* plant and controlling the rate as defined. In such case, controlling the rate may be performed a *Cannabis* farmer partially turning off a water supply. The methods disclosed herein may also be performed by a system, preferably automatically. Such system may comprise a pruning robot that is configured to prune the *Cannabis* plant and/or may comprise a control system that is configured to control the rate as defined.

Before the pruning, the plant may have a first transpiration capacity. After the pruning the plant may have a second transpiration capacity that is lower than the first transpiration capacity. The first rate is then preferably appropriate for the first transpiration capacity and the second rate is then preferably appropriate for the second transpiration capacity. A transpiration capacity may indicate a maximum amount of water per unit of time that can evaporate from the *Cannabis* plant, for example through the stomata of its leaves. A rate being appropriate for a given transpiration capacity may be understood as that the rate is such that the plant can perform the required functions for growth and development of the plant, such as photosynthesis, respiration and transpiration, without the amount of water in the plant being a limiting factor, yet without causing excess water is in the plant. The latter may happen when the amount of water provided per unit of time exceeds the total amount of water per unit of time that can be removed from the plant by photosynthesis, respiration and transpiration.

In an embodiment, the *Cannabis* plant is a *Cannabis Sativa* plant, e.g. a *Cannabis Sativa* L. plant, or Indica plant.

The first rate per *Cannabis* plant is for example between 700-900 milliliters/day. The second rate is for example between 350-550 milliliters/day. The second rate may be higher than zero. The second rate may be between 30% and 90% of the first rate, preferably between 30% and 80% of the first rate, more preferably between 40% and 70% of the first rate.

Said pruning may involve a reduction of biomass of the *Cannabis* plant by at least 10% or by at least 20%, for example. A pruning or pruning event as referred to herein may be understood to begin with the removal of a leave or branch from the plant and may be understood to prolong as long as at least one leave or branch is removed per fifteen minutes, preferably per ten minutes, more preferably per five minutes. Thus, if no leave or branch has been removed in the last fifteen resp. ten resp. five minutes, it may be understood that no pruning is occurring and/or that a pruning has ended.

The change may be continuous in the sense that the rate is gradually adapted, i.e. gradually lowered. In another embodiment, the change may involve first completely shutting off the water provisioning, preferably only for a short time period, and then increasing the rate of water provisioning to the second rate. In an example embodiment, the plant is on a first irrigation regime before pruning in which the plant receives A milliliters per 24 hours and after pruning on a second regime in which the plant receives B milliliters per 24 hours, B being lower than A.

After the rate of water provisioning has changed from the first rate to the second rate, the rate of water provisioning may be kept lower than the first rate for at least fifteen minutes, preferably for at least an hour, more preferably for at least a day, most preferably for at least two days.

In an embodiment, the method comprises changing the rate of water provisioning from the first to the second rate in a time window that extends from one hour before said pruning to one hour after said pruning.

"Before the pruning" as used herein may be understood to refer to "before the start of pruning". "After the pruning" as used herein may be understood to refer to "after the end of the pruning".

In an embodiment, the time window extends from half an hour before said pruning to 15 minutes after said pruning. The time window may be predetermined.

Changing the rate in a time window may be understood as that the change is initiated somewhere in said time window and/or as that the change is completed somewhere in said time window. Thus, changing the rate after a point in time may be understood as that the rate starts to change after said point in time. Changing the rate before a point in time may be understood as that the change from first to second rate is completed before said point in time. It should be appreciated that typically, the change itself will not take as long as the time window itself.

In an embodiment, the method comprises changing the rate of water provisioning from the first rate to the second rate in a time window that extends from 15 minutes before said pruning to 15 minutes after said pruning.

The pruning is the cause of the reduced transpiration capabilities of the plant, hence, reducing the rate too long before pruning may lead to underwatering of the plant. At the same time, waiting too long after pruning to reduce the rate may lead to overwatering the plant. The below table indicates several embodiments of respective time windows that can be implemented in the methods described herein, i.e. respective time windows in which the rate should be changed from first rate to second rate.

In an embodiment, the time window extends

| from: | to: |
|---|---|
| two hours before pruning | two hours after pruning |
| two hours before pruning | one hour after pruning |
| two hours before pruning | half an hour after pruning |
| two hours before pruning | 15 minutes after pruning |
| two hours before pruning | 10 minutes after pruning |
| two hours before pruning | 5 minutes after pruning |
| one hour before pruning | two hours after pruning |
| one hour before pruning | one hour after pruning |
| one hour before pruning | half an hour after pruning |
| one hour before pruning | 15 minutes after pruning |
| one hour before pruning | 10 minutes after pruning |
| one hour before pruning | 5 minutes after pruning |
| half an hour before pruning | two hours after pruning |
| half an hour before pruning | one hour after pruning |
| half an hour before pruning | half an hour after pruning |
| half an hour before pruning | 15 minutes after pruning |
| half an hour before pruning | 10 minutes after pruning |
| half an hour before pruning | 5 minutes after pruning |
| 15 minutes before pruning | two hours after pruning |
| 15 minutes before pruning | one hour after pruning |
| 15 minutes before pruning | half an hour after pruning |
| 15 minutes before pruning | 15 minutes after pruning |
| 15 minutes before pruning | 10 minutes after pruning |
| 15 minutes before pruning | 5 minutes after pruning |
| 10 minutes before pruning | two hours after pruning |
| 10 minutes before pruning | one hour after pruning |
| 10 minutes before pruning | half an hour after pruning |
| 10 minutes before pruning | 15 minutes after pruning |
| 10 minutes before pruning | 10 minutes after pruning |
| 10 minutes before pruning | 5 minutes after pruning |
| 5 minutes before pruning | two hours after pruning |
| 5 minutes before pruning | one hour after pruning |
| 5 minutes before pruning | half an hour after pruning |
| 5 minutes before pruning | 15 minutes after pruning |
| 5 minutes before pruning | 10 minutes after pruning |
| 5 minutes before pruning | 5 minutes after pruning |

The most preferred embodiment comprises changing the rate of water provisioning to the *Cannabis* plant from the first rate to the second rate in a time window extending from 5 minutes before pruning to 5 minutes after pruning.

In an embodiment, the method comprises determining an amount of pruned material of the *Cannabis* plant that is pruned during said pruning and/or determining an amount of remaining material of the *Cannabis* plant that is not pruned during said pruning. This embodiment further comprises, based on the determined amount of pruned material and/or of remaining material, determining the second rate.

Thus, in this embodiment, the rate is adapted in dependence of the amount of plant material that is removed with the pruning. Naturally, the more material is removed, the more the transpiration capabilities of the plant are reduced. Hence, the more material is removed during pruning, the more the rate should be reduced. This embodiment enables to ensure that the rate is adapted as appropriate.

This step of determining an amount of pruned material may be performed by a control system as described herein.

The amount of pruned material and/or the amount of remaining material may be an expected amount that will be pruned and/or that will be left over after pruning. Then, the amount is a predicted amount. Such amount can be predicted based on a predetermined pruning strategy. The amount of pruned material and/or the amount of remaining material may also refer to an amount that has actually been removed and/or that remains after the pruning has actually been performed.

In an embodiment, determining the amount of pruned material comprises weighing the amount of pruned material. This embodiment allows to accurately determine the second rate.

In an embodiment, the method comprises obtaining one or more images representing the *Cannabis* plant before and/or during and/or after said pruning, and, based on said one or more images, determining the amount of pruned material and/or of remaining material.

The *Cannabis* plant may be monitored using an imaging system, such as a camera system. Such imaging system may then be configured to capture images of at least part of the *Cannabis* plant. These image may show how much material of the plant is removed during pruning and/or how much material remains.

In an embodiment, the method comprises obtaining a first image representing at least part of the *Cannabis* plant before said pruning and obtaining a second image representing at least part of the *Cannabis* plant after said pruning. Based on a difference between the first and second image, the amount of pruned material and/or of remaining material can be determined.

In an embodiment, the method comprises determining the amount of remaining material comprises determining, e.g. estimating, a number of leaves that are still on the *Cannabis* plant after said pruning.

This step may be performed by a control system described herein, for example based on one or more images as captured by the imaging system.

Since the leaves contain the stomata through which water evaporates from the plant, determining how many are left after pruning is an efficient method for determining the appropriate second rate. Of course, determining the number of remaining leaves may be performed based on one or more images representing at least part of the plant as described above.

In an embodiment, the method comprises, based on the amount of remaining material, determining a transpiration capacity of the *Cannabis* plant, said transpiration capacity indicating a maximum amount of water per unit of time that can evaporate from the *Cannabis* plant after the pruning. This embodiment further comprises, based on the determined transpiration capacity, determining the second rate of water provisioning.

This embodiment enables to accurately determine the appropriate rate for the time period after pruning.

Determining the second rate based on the determined transpiration capacity may comprises determining that the determined transpiration capacity is below a threshold capacity and, in response, determining the second rate.

In an embodiment, the method comprises after providing water to the *Cannabis* plant at the second rate, increasing the rate of water provisioning to the *Cannabis* plant.

This embodiment may comprise monitoring growth and development of the plant, such as an increase in biomass of the plant, and based on such monitoring, increasing the rate of water provisioning again.

Typically, several day, e.g. 2-6 days after the pruning the rate of water provisioning can be increased again. This increase may be performed in dependence of the growth and development of the *Cannabis* plant as well as of the radiant power of the illumination provided to the *Cannabis* plant. Such growth can for example be measured by measuring the plant height and/or the stem diameter.

In an embodiment, increasing the rate of water provisioning to the *Cannabis* plant comprises increasing the rate of water provisioning to a third rate that is equal to or higher than said first rate.

This embodiment enables to provide the appropriate rate at any given time during its growth cycle. The second rate that is provided during at least the second time period may form a temporary "dip" in the rate as provisioned throughout the growth cycle of the plant.

As is clear for the skilled person, the *Cannabis* plant can be, and typically is, pruned several times throughout its growth cycle. The methods described herein can be performed for each pruning.

In an embodiment, the method comprises, after the second time period, increasing the rate of water provisioning to a fourth rate and, at least during a time period before a further pruning of the plant, providing water to the *Cannabis* plant at the fourth rate. This embodiment further comprises again pruning the *Cannabis* plant and changing the rate of water provisioning to the *Cannabis* plant from the fourth rate to a fifth rate in a predetermined further time window, the fifths rate being lower than the fourth rate and, during at least a time period after said further pruning of the *Cannabis* plant, providing water to the *Cannabis* plant at the fifth rate.

The fourth rate and the third rate may or may not be the same as the third rate.

The further time window may extend from a third point in time relative to the further pruning to a fourth point in time relative to the further pruning, similar as to how the time window extends from a first point in time relative to the earlier pruning to a second point in time relative to the earlier pruning. Thus, in an embodiment, the further time window extends from 5 minutes before said further pruning to 5 minutes after said pruning.

In an embodiment, a difference between the first rate and second rate is at least 100 milliliters/day, preferably at least 200 milliliters per day.

In an embodiment, the method comprises determining the second rate of water provisioning based on at least one of:
 a radiant power of light provided to the *Cannabis* plant,
 an ambient temperature at the *Cannabis* plant, and
 a relative humidity of air at the *Cannabis* plant.

The radiant power may expressed as a "photosynthetic photon flux density".

One aspect of this disclosure relates to an irrigation system for irrigating a *Cannabis* plant. The system comprises a water provisioning system that is configured to provide water at a controllable rate to the *Cannabis* plant and a control system. The control system is configured to
 determine when a pruning of the *Cannabis* plant is performed, and to
 control the water provisioning system to, before a pruning of the *Cannabis* plant, provide water to the *Cannabis* plant at a first rate, and to
 control the water provisioning system to, before and/or during and/or after said pruning, change the rate of water provisioning to the *Cannabis* plant from the first rate to a second rate, the second rate being lower than the first rate, and to
 control the water provisioning system to, after said pruning of the *Cannabis* plant, provide water to the *Cannabis* plant at the second rate.

Of course, the control system may be configured to determine the second rate in accordance with the methods described herein.

One aspect of this disclosure relates to a computer-implemented method for controlling an irrigation system for irrigating a *Cannabis* plant, wherein the irrigation system comprises a water provisioning system that is configured to provide water at a controllable rate to the *Cannabis* plant. The computer-implemented method comprises determining when a pruning of the *Cannabis* plant is performed, and controlling the water provisioning system to, before a pruning of the *Cannabis* plant, provide water to the *Cannabis* plant at a first rate, and controlling the water provisioning system to, before and/or during and/or after said pruning, change the rate of water provisioning to the *Cannabis* plant from the first rate to a second rate, the second rate being lower than the first rate, and controlling the water provisioning system to, after said pruning of the *Cannabis* plant, provide water to the *Cannabis* plant at the second rate.

This computer-implemented method may comprise any of the steps described herein. The computer-implemented method for example comprises any of the steps that are performed for determining the second rate, such as determining the amount of pruned and/or remaining material based on one or more images. The computer-implemented method for example comprises controlling an imaging system such that is captures one or more images of the *Cannabis* plant as described herein.

One aspect of this disclosure relates to a computer program comprising instructions which, when the program is executed by a control system of an irrigation system described herein, cause the control system to perform any of the methods described herein.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing control systems or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which:

FIG. 1 shows irrigation schemes according to respective embodiments;

DETAILED DESCRIPTION OF THE DRAWINGS

In the figures identical reference numbers indicate identical or similar elements.

FIG. 1A illustrates a method for irrigating a *Cannabis* plant according to an embodiment. FIG. 1A is a diagram illustrating an irrigation scheme which may the result of performing an irrigation method according to an embodiment. In this diagram, the vertical axis indicates a rate of water provisioning to a *Cannabis* plant. Typically, such rate of water provisioning is expressed an amount of water provided per unit of time, such as liters per hour. The water may be provided using a water provisioning system known in the art.

The horizontal indicates time in number of weeks. Note that the zeroth week corresponds to the moment cuttings are made from the mother plant and inserted in soil. The three arrows in the diagram indicate the respective times at which the *Cannabis* plant is pruned. It should be appreciated that such pruning may be performed manually, for example by a *Cannabis* farmer, or automatically, for example by a pruning robot. Such robot may be under control of a control system as described herein.

The diagram may be understood to depict a full life cycle of a *Cannabis* plant from seedling to harvest. The first period of the life cycle, also referred to as the growth cycle, is the so-called seedling phase. The next growth stage of the *Cannabis* plant is the so-called vegetative state and the last growth stage of the *Cannabis* plant is the flowering phase. In the last phase, the flowers of the *Cannabis* plant develop. These flowers contain the by-products of interest.

The diagram of FIG. 1A indicates how the rate changes with time. As can be seen, the general trend is that the rate increases, which is understandable, since the plant grows and therefore requires more water so that it can perform well the photosynthesis, respiration and transpiration.

As indicated, during this example life cycle, the *Cannabis* plant is pruned three times. However, typically, the plant may be pruned more times, such as four times, five times or even more times. In production of medicinal *Cannabis*, some optimum pruning strategy is put in place to optimize the shape of the plant at a later stage. In some cases, half of the plant is taken away. As a result, the capacity for the plant to transpire is strongly reduced as well. After pruning, the plants continue to grow and new shoots will re-appear in 1 or 3 days. Then, new pruning will be planned to remove these new shoots again.

Figure 2:
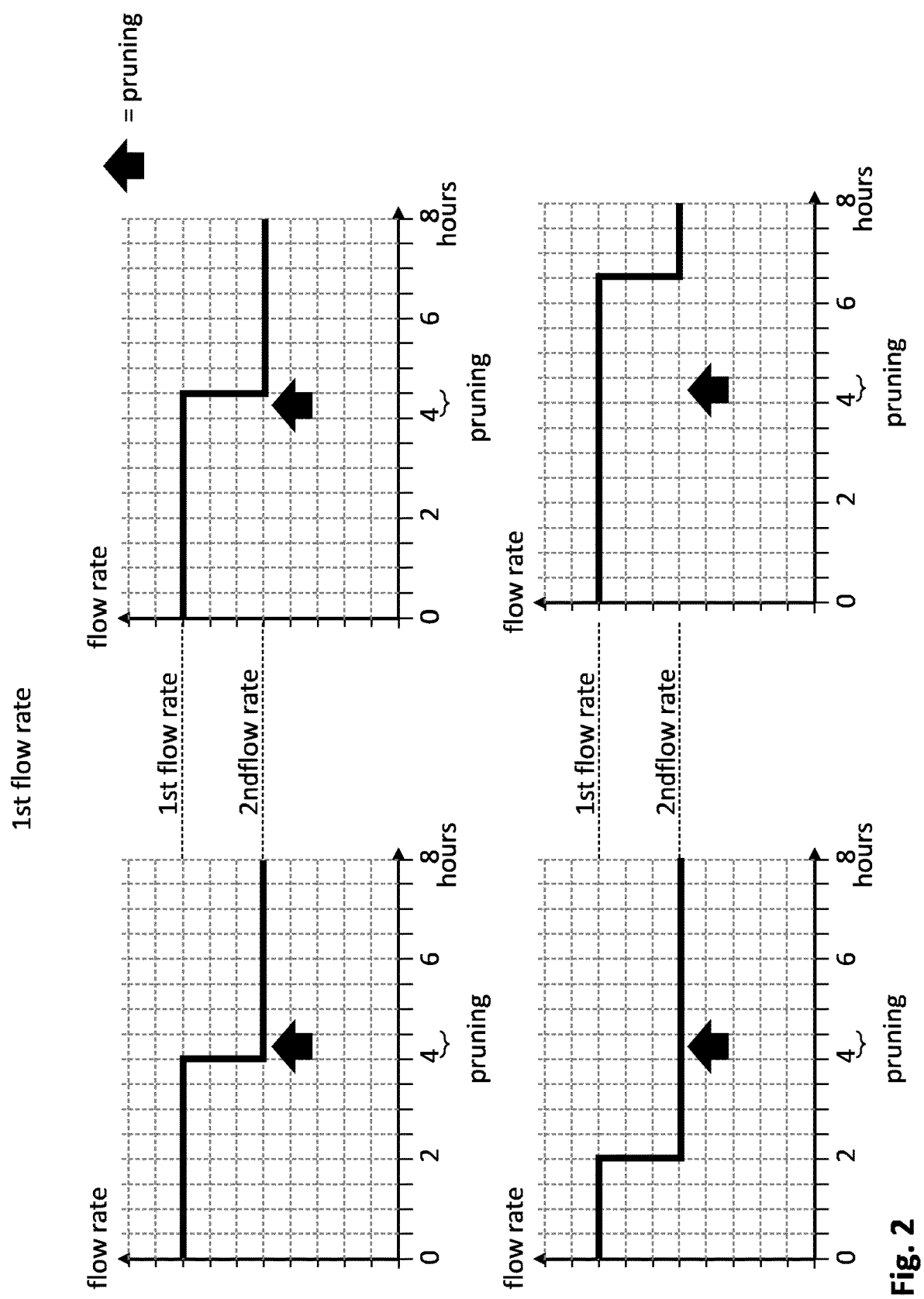
FIGS. 2-4 illustrates the rate can be changed from the first rate to the second rate relative to the pruning, according to respective embodiments.
Figure 3:
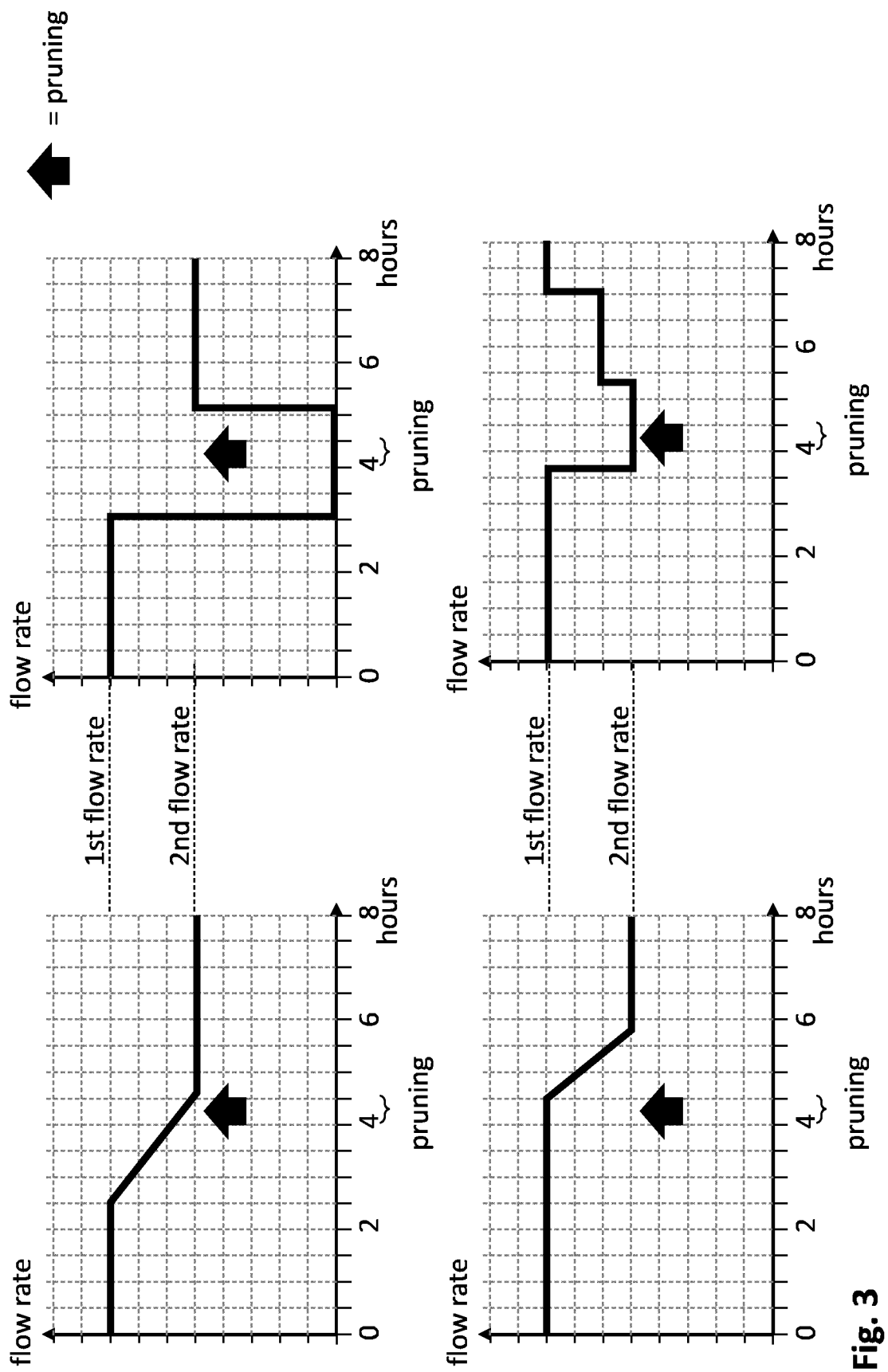
Figure 4:
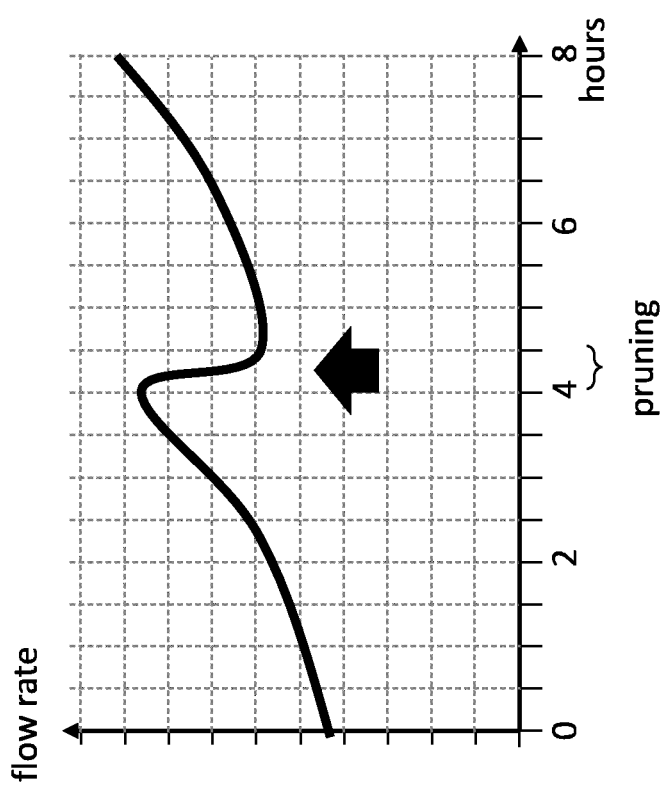

The diagram of FIG. 1A shows that before the first pruning event, water is provided to the *Cannabis* plant at a rate A. FIG. 1A shows that before and/or during and/or after said pruning the rate changes from rate A to rate B and that the rate B is at least provided after the pruning. (More detailed embodiments of how the rate can be changed are shown in FIGS. 2-4.) Note that rate B is lower than rate A. The pruning namely reduces the transpiration capabilities and therefore the plant can process less water per unit of time. Hence, if the rate would be maintained at level A, the plant would be unable to get rid of all of its water content and the plant root may be drawn for a few days. This limits the nutrient uptake and good functioning of the plant and limits growth. Hence, due the rate B being lower than rate A, overwatering the plant is prevented and so the plant can grow without being hampered. This benefits the overall yield of a medicinal *Cannabis* farm. A further advantage of such method is that the plant need not make new leaves in order to re-achieve a transpiration capacity in order to cope with the too high rate.

Transpiration serves three roles in a plant:

Movement of minerals up from the root and sugars (products of photosynthesis) throughout the plant. Water serves as both the solvent and the way of transport.

Cooling—80% of the cooling effect is from the evaporative cooling effects of transpiration. Evaporative cooling is the most efficient way to cool a surface because of the large heat capacity of water.

Turgor pressure—Water maintains the turgor pressure in cells much like air inflates a balloon, giving the non-woody plant parts form. Turgidity is important so the plant can remain stiff and upright and gain a competitive advantage when it comes to light. Turgidity is also important for the functioning of the guard cells, which surround the stomata and regulate water loss and carbon dioxide uptake. Turgidity also is the force that pushes roots through the soil.

As said, the general trend of the rate is that it increases as the plant grows. Therefore, as shown in the diagram of FIG. 1A, the rate of water provisioning is increased after providing water at rate B. In particular, the rate is increased to a rate C, be it in a step-wise manner, which is higher than rate A. In that sense, rate C is an example of a "third rate"—that is higher than the "first rate"—described above.

The difference between rate A and rate B is for example at least 100 milliliters per day.

FIG. 1A illustrates that the method for irrigating a *Cannabis* plant as described herein may be repeated several times during a growth cycle, namely each time that the plant is pruned. Note that before the second pruning event, a rate C is provided to the *Cannabis* plant, whereas after the second pruning event, a lower rate, namely rate D, is provided to the *Cannabis* plant. For the third pruning event also: before pruning, rate of water provisioning E is provided to the *Cannabis* plant and after pruning rate F is provided that is lower than rate E.

FIG. 1B is a diagram illustrating an irrigation scheme corresponding to an irrigation method according to another embodiment. Herein, the rate does not plateau, i.e. does not remain constant during a prolonged period of time, for example for more than one day, as may very well be the case (see FIG. 1A). In FIG. 1B, the rate is continuously varied, in principle increased, as the plant grows during its lifecycle, except at pruning events, where the rate is decreased. Also in this embodiment, a rate (B resp. D) after a pruning is lower than a rate (A resp. C) before the pruning.

FIG. 2 shows four diagrams illustrating irrigation schemes that are the result of performing a method according to an embodiment. The arrows in the respective diagrams indicate a pruning of the *Cannabis* plant. Note that the arrows covers a time period of approximately half an hour, so in this particular example, the time difference between starting the pruning and finishing the pruning is approximately half an hour. However, the time between starting and ending the pruning depends on how much of the material is pruned. Typically, pruning can be performed in approximately ten minutes. The top left and the bottom left diagram illustrate that the rate can be changed from the first rate to the second rate already before the pruning. The top right and the bottom right diagram illustrate that the rate can also be changed after the pruning. Of course, the rate may also be changed from the first rate to the second rate during the pruning itself.

As explained above, the rate is preferably changed in a time window that is defined such that the rate is not changed too early, i.e. too long before pruning takes place, which would bring the risk of underwatering, yet such that the rate is not changed too late, i.e. too long after the pruning has been performed, which would bring the risk of overwatering. The time window for example extends from one hour before said pruning to one hour after said pruning. Note that the top diagrams show a change within such time window because the rate is changed just before pruning (top left diagram) resp. just after pruning (top right diagram), and thus in a time window extending from one hour before pruning to one hour after pruning. In another example, the time window in which the rate is changed from the first rate to the second rate extends from 15 minutes before said pruning to 15 minutes after said pruning.

FIG. 3 illustrates further examples of how the rate of water provisioning can be changed before and/or during and/or after the pruning. In the top left diagram, the change from first to the second rate initiates two hours before the pruning and completes at the moment that the pruning is completed. The change is a continuous decrease of rate from the second to the first rate.

The bottom left diagram illustrates an embodiment wherein the change of the rate initiates when the pruning is completed and the change is completed, i.e. the second rate is reached, approximately 75 minutes after the end of the pruning.

The top right diagram illustrates an embodiment wherein prior to pruning the water flow is completely switched off, i.e. the rate of water provisioning is reduced to zero. During pruning, the water flow remains switched off. Then, approximately half an hour after pruning, the rate is set at the second rate.

All the diagrams in FIG. 3 illustrate respective embodiments wherein the rate is changed from the first rate to the second rate in a time window extending from two hours before the pruning to two hours after the pruning.

FIG. 4 illustrates that the rate may be varied continuously.

FIG. 5A-5D are flow charts illustrating methods according to respective embodiments that comprise determining the second rate. Such methods may be computer-implemented and may be performed by a control systems described herein.

Of course, after such determination of the second rate, the method comprises providing, at some point in time, at least after the pruning of the Cannabis plant, the second rate of water provisioning to the Cannabis plant.

Figure 5:
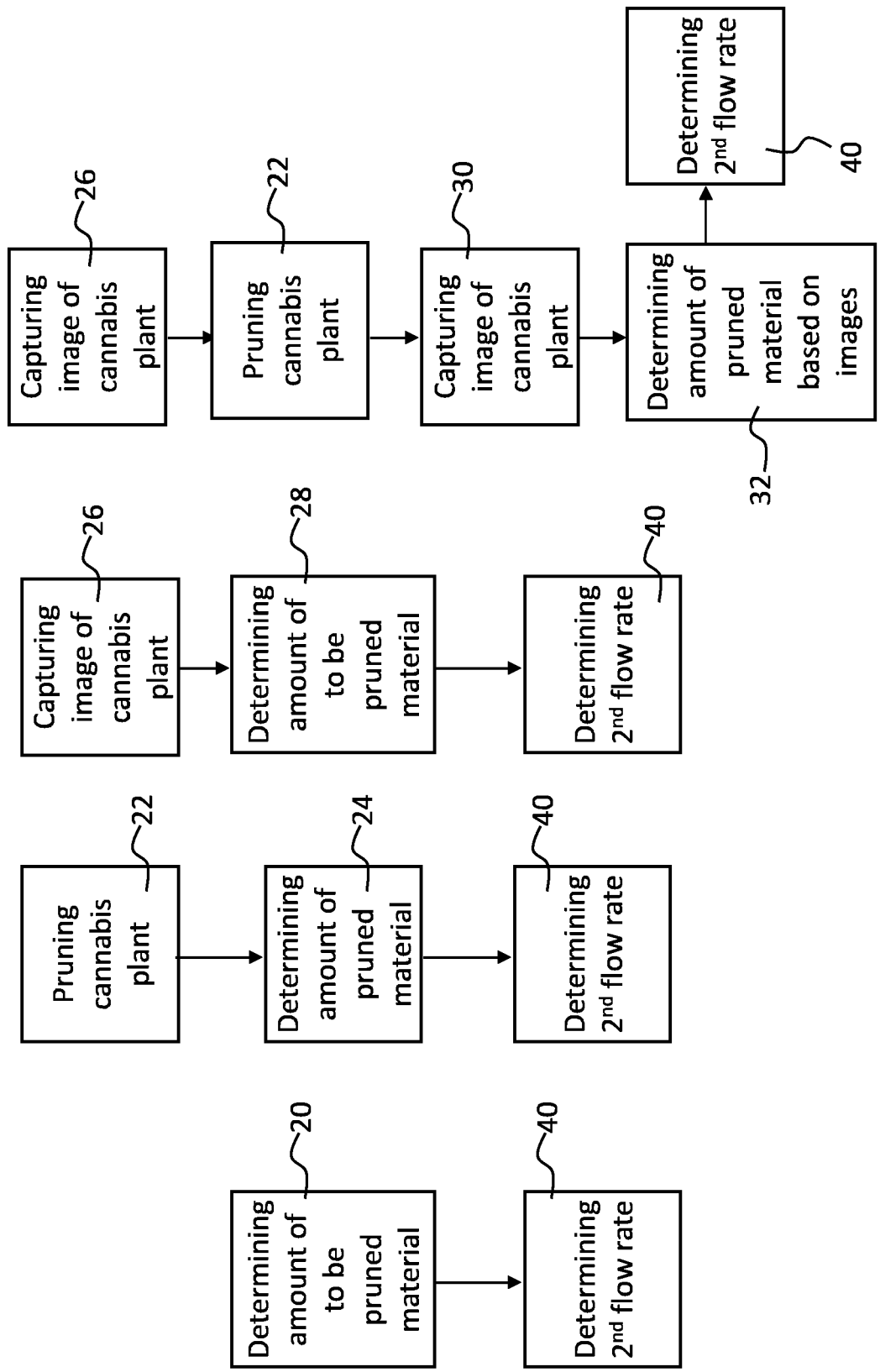
FIG. 5 shows several flow charts illustrating methods according to respective embodiments.

FIG. 5A is a flow chart illustrating a method according to an embodiment that comprises determining an amount of material that is to be pruned, which is indicated by step 20. This step may be performed by a control system as described herein and based on one or more images representing at least part of the Cannabis plant. It should be appreciated that by determining the amount of material that is to be pruned, in principle, the amount of remaining material, i.e. plant material that will not be pruned, may also be determined.

Then, in step 40, based on the determined amount of to be pruned material, the second rate is determined. As a general rule, the more material is pruned, the more the rate should be reduced, i.e. the larger the difference is between the first rate and the second rate should be. Determining the second rate based on the amount of pruned material may comprise determining a transpiration capacity of the pruned material. This may be performed by determining how many leaves are in the pruned material. The total transpiration capacity of the pruned material may then be estimated by multiplying the number of leaves with some known, average transpiration capacity per leaf. The average transpiration per Cannabis leaf may be measured beforehand using methods known in the art, for example as described in Remote Sens. 2020, 12, 3182; doi: 10.3390/rs12193182 *Hyperspectral and Thermal Sensing of Stomatal Conductance, Transpiration, and Photosynthesis for Soybean and Maize under Drought*. Such an average transpiration capacity per leaf may also be known from literature. Based on the total transpiration capacity represented by the pruned material, the remaining transpiration capacity of the Cannabis plant after pruning can be determined. Based on this determined transpiration capacity of the Cannabis plant, the second rate can be determined.

It should be appreciated that, similarly as to how determining an amount of pruned material may be understood as equivalent to determining an amount of non-pruned, remaining material, determining a transpiration capacity of the pruned material may be understood equivalent to determining a transpiration capacity of the Cannabis plant after pruning.

FIG. 5B is a flow chart illustrating a method according to an embodiment, wherein an amount of material is determined that has actually been pruned. This embodiment comprises a step 22 of pruning the Cannabis plant. This step may be performed by a human person or by a pruning robot optionally under control of a control system as described herein. Then, in step 24, the amount of pruned material is determined. This step may be performed by weighing the pruned material. Additionally or alternatively, this step comprises counting how many leaves have been pruned. Then, in step 40, the second rate is determined.

FIG. 5C is a flow chart illustrating a method according to an embodiment, wherein the amount of to be pruned material is determined based on one or more captured images representing at least part of the Cannabis plant. This method comprises a step 26 of capturing an image of the Cannabis plant before it is pruned. Then, based on this image, in step 28, the amount of material that will be pruned is determined. Based on this amount of to be pruned material, the second rate is determined in step 40.

FIG. 5D is a flow chart illustrating a method according to an embodiment, wherein the amount of actually pruned material is determined based on at least two images. One of these at least two images is taken before pruning and represents at least part of the Cannabis plant before pruning and a second image of these at least two images is taken after pruning and represent at least part of the Cannabis plant after pruning. In step 26 the first image is captured. Then, in step 22, the Cannabis plant is pruned. In step 30, again, an image of the Cannabis plant is captured. Step 32 comprises determining an amount of pruned material (and thus an amount of remaining material) based on the images obtained in steps 26 and 30 respectively. This step may comprise image analyses techniques. In such method, machine learning may be used so that a data processing system, e.g. the control system described herein, can automatically estimate an amount of pruned material and/or remaining material on the Cannabis plant based on one or more images. Then, in step 40, the second rate is determined based on the determined amount of pruned material. A self-learning system may be implemented that can record irrigation strategies for respective pruning event, such as for respective amounts of removed material, and subsequent responses, e.g. ultimate yields, of Cannabis plants to find optimum irrigation strategy for any given pruning event.

The second rate may also be determined based on further parameters such as
- a radiant power of light provided to the Cannabis plant,
- an ambient temperature at the Cannabis plant, and
- a relative humidity of air at the Cannabis plant.

Typically a higher radiant power of light provided to the *Cannabis* plant causes more water to evaporate from the *Cannabis* plant per unit of time. Therefore, the higher the radiant power, the higher the rate of water provisioning should be in order to maintain an appropriate amount of water in the *Cannabis* plant.

The same applies to the ambient temperature. A higher ambient temperature causes more water to evaporate from the *Cannabis* plant per unit of time. Therefore, the higher the ambient temperature, the higher the rate should be in order to maintain an appropriate amount of water in the *Cannabis* plant.

A higher relative humidity causes less water to evaporate per unit of time from the *Cannabis* plant. Therefore, the higher the relative humidity, the lower the rate should be in order to maintain an appropriate amount of water in the *Cannabis* plant.

Figure 6:
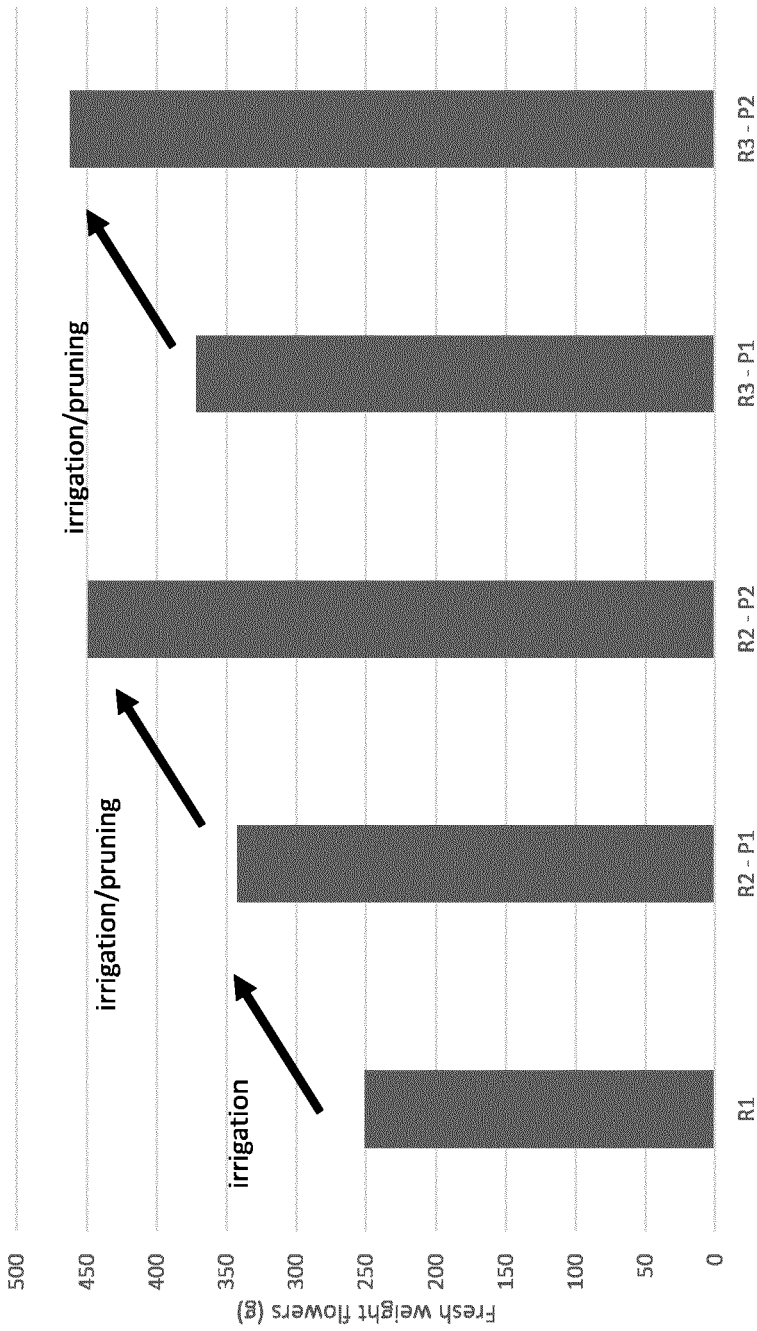
FIG. 6 illustrate the yields of respective batches of *Cannabis* plants in dependence of irrigation and pruning strategies.

FIG. 6 illustrates the effect of the increased yield caused by performing an irrigation method as disclosed herein. Each bar represents the yield, in this case the amount of fresh weight of the flowers, of a specific batch of *Cannabis* plants, namely "THC dominant". The batches of *Cannabis* plants were treated the same, only the irrigation method and the pruning strategy varied between them.

Batch R1 may be regarded as the control batch. In this batch, no pruning was performed and the rate of water provisioning was kept constant. The soil of batch R1 was observed to quite wet which hampered nutrient uptake by the plant. Hence, batch R1 illustrates the negative effect of overwatering on the yield.

For batches R2-P1, R2-P2, R3-P1, R3-P2 a method for irrigation was employed according to an embodiment. After each pruning, the rate of water provisioning was reduced. As indicated in FIG. 6, these batches have a higher yield than batch R1.

Further, the *Cannabis* plants in batch R2-P1 and R3-P1 were pruned in accordance with a first pruning strategy and the *Cannabis* plant in batches R2-P2 and R3-P2 were pruned in accordance with a different, second pruning strategy. The first pruning strategy involved pruning leaves, side shoots and reducing the number of branches. The second pruning strategy involved only pruning leaves and side shoots. In this example, the second pruning strategy led to higher yields.

Similar effects were observed on different cultivars (THC poor and CBD rich)

Figure 7:
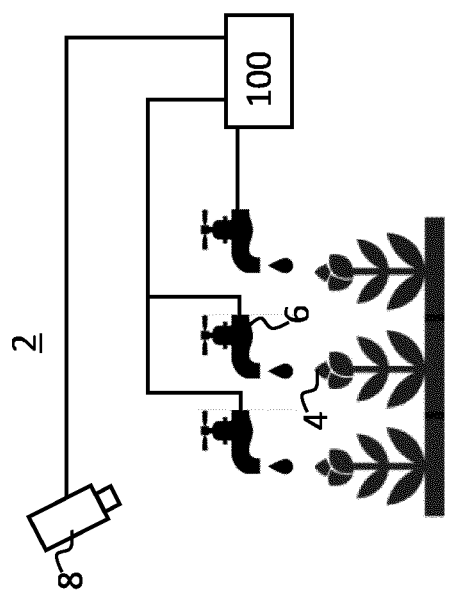
FIG. 7 schematically illustrates an irrigation system according to an embodiment.

FIG. 7 schematically illustrates an irrigation system 2 for irrigating a *Cannabis* plant 4. The system 2 comprises a water provisioning system 6 that is configured to provide water at a controllable rate to the *Cannabis* plant 4. The water provisioning system is for example any drip irrigation system known in the art. The rate with which water is provided to the *Cannabis* plant may refer to a flow rate, which is the volume of water which passes per unit of time, for example which passes through one or more nozzles for watering the *Cannabis* plant or which passes through a tube of such drip irrigation system. The rate is preferably controllable by the hour, at least, preferably by the minute, at least. The system 2 further comprises a control system 100 that is configured to determine when a pruning of the *Cannabis* plant is performed. The control system may be configured to determine when a pruning is performed based on a user input. A user may for example input a pruning schedule which defines at what times the *Cannabis* plant is pruned. Such pruning schedule may also be preprogrammed. A user input may also indicate that the *Cannabis* plant is being pruned and/or has just been pruned. The control system 100 is configured to control the water provisioning system 6 to, before a pruning of the *Cannabis* plant, provide water to the *Cannabis* plant at a first rate. Further, the control system 100 is configured to control the water provisioning system 6 to, before and/or during and/or after said pruning, change the rate of water provisioning to the *Cannabis* plant 4 from the first rate to a second rate, the second rate being lower than the first rate. Further, the control system 100 is configured to control the water provisioning system 6 to, after said pruning of the *Cannabis* plant 4, provide water to the *Cannabis* plant 4 at the second rate.

Optionally, the system 2 comprises an imaging system 8 that is configured to capture one or more images of at least part of *Cannabis* plant 4. The imaging system may be a camera system which can monitor entire parts of a *Cannabis* farm. The imaging system 8 may be controlled by the control system 100.

Figure 8:
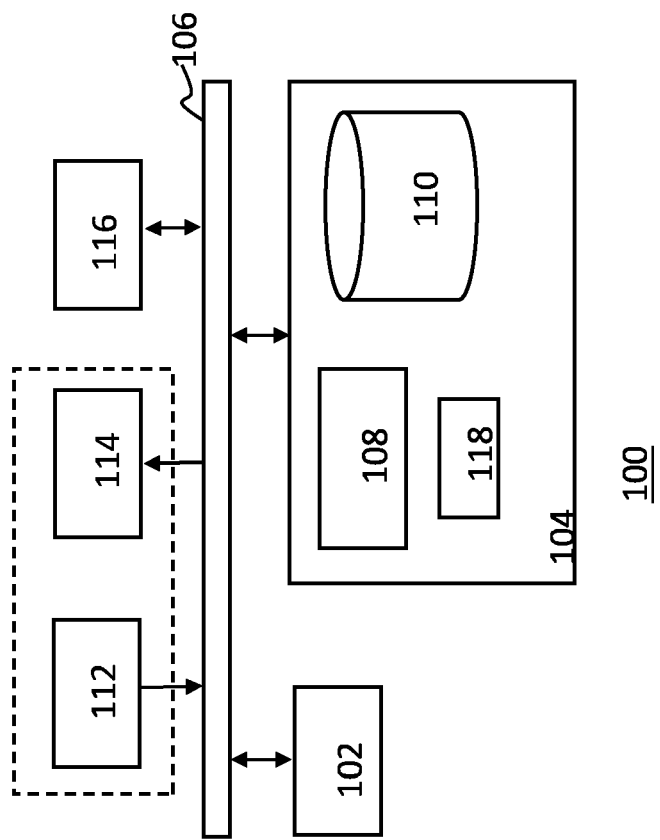
FIG. 8 illustrates a control system according to an embodiment.

FIG. 8 depicts a block diagram illustrating a data processing system according to an embodiment.

As shown in FIG. 8, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 8, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 8) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In one aspect of the present invention, the data processing system 100 may represent a control system as described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for irrigating a *Cannabis* plant, the method comprising sequentially performing the steps of
   providing, before a pruning of the *Cannabis* plant, water to the *Cannabis* plant at a first rate, and
   changing, in a time window that extends from one hour before said pruning to one hour after said pruning, the rate of water provisioning to the *Cannabis* plant from the first rate to a second rate, the second rate being lower than the first rate, and
   providing, after said pruning of the *Cannabis* plant, water to the *Cannabis* plant at the second rate for at least 15 minutes.

2. The method according to claim 1, comprising changing the rate of water provisioning from the first rate to the second rate in a time window that extends from 15 minutes before said pruning to 15 minutes after said pruning.

3. The method of claim 1, further comprising the step of pruning the *Cannabis* plant.

4. The method according to claim 1, further comprising
   determining an amount of pruned material of the *Cannabis* plant that is pruned during said pruning and/or determining an amount of remaining material of the *Cannabis* plant that is not pruned during said pruning, and
   based on the determined amount of pruned material and/or of remaining material, determining the second rate.

5. The method according to claim 4, further comprising
   obtaining one or more images representing the *Cannabis* plant before and/or during and/or after said pruning, and
   based on said one or more images, determining the amount of pruned material and/or of remaining material.

6. The method according to claim 4, wherein determining the amount of remaining material comprises determining a number of leaves that are still on the *Cannabis* plant after said pruning.

7. The method according to claim 4, further comprising
   based on the amount of pruned material and/or remaining material, determining a transpiration capacity of the *Cannabis* plant, said transpiration capacity indicating a maximum amount of water per unit of time that can evaporate from the *Cannabis* plant after the pruning, and
   based on the determined transpiration capacity, determining the second rate of water provisioning.

8. The method according to claim 1, wherein determining the amount of pruned material comprises weighing the amount of pruned material.

9. The method according to claim 1, further comprising after providing water to the *Cannabis* plant at the second rate for at least 15 minutes, increasing the rate of water provisioning to the *Cannabis* plant.

10. The method according to claim 9, wherein increasing the rate of water provisioning to the *Cannabis* plant comprises increasing the rate of water provisioning to a third rate that is equal to or higher than said first rate.

11. The method according to claim 1, wherein a difference between the first rate and second rate is at least 100 milliliters per day.

12. The method according to claim 1, comprising determining the second rate of water provisioning based on at least one of:
- a radiant power of light provided to the *Cannabis* plant,
- an ambient temperature at the *Cannabis* plant, and
- a relative humidity of air at the *Cannabis* plant.

13. An irrigation system for irrigating a *Cannabis* plant, the system comprising:
- a water provisioning system that is configured to provide water at a controllable rate to the *Cannabis* plant, and
- a control system that is configured to:
    - determine when a pruning of the *Cannabis* plant is performed, and
    - control the water provisioning system to sequentially
        - provide, before said pruning of the *Cannabis* plant, water to the *Cannabis* plant at a first rate, and to
        - change, in a time window that extends from one hour before said pruning to one hour after said pruning, the rate of water provisioning to the *Cannabis* plant from the first rate to a second rate, the second rate being lower than the first rate, and to
        - provide, after said pruning of the *Cannabis* plant, water to the *Cannabis* plant at the second rate for at least 15 minutes.

14. A computer-implemented method for controlling an irrigation system for irrigating a *Cannabis* plant, wherein the irrigation system comprises a water provisioning system that is configured to provide water at a controllable rate to the *Cannabis* plant, the computer-implemented method comprising:
- determining when a pruning of the *Cannabis* plant is performed, and
- controlling the water provisioning system to sequentially:
    - provide, before a pruning of the *Cannabis* plant, water to the *Cannabis* plant at a first rate, and
    - change, in a time window that extends from one hour before said pruning to one hour after said pruning, the rate of water provisioning to the *Cannabis* plant from the first rate to a second rate, the second rate being lower than the first rate, and
    - provide, after said pruning of the *Cannabis* plant, water to the *Cannabis* plant at the second rate for at least 15 minutes.

15. A non-transitory computer readable medium comprising instructions which, when the instructions are executed by a control system of a irrigation system, cause the control system to perform the method according to claim 1.

* * * * *